(No Model.)

M. FRISBIE.
DRAFT EQUALIZER.

No. 263,888. Patented Sept. 5, 1882.

WITNESSES:
W. H. H. Knight
Harry Berchard

INVENTOR:
Mark Frisbie
By Edson Bros.
Attorneys

UNITED STATES PATENT OFFICE.

MARK FRISBIE, OF ORLAND, INDIANA.

DRAFT-EQUALIZER.

SPECIFICATION forming part of Letters Patent No. 263,888, dated September 5, 1882.

Application filed July 18, 1882. (No model.)

*To all whom it may concern:*

Be it known that I, MARK FRISBIE, a citizen of the United States, residing at Orland, in the county of Steuben and State of Indiana, have invented certain new and useful Improvements in Whiffletrees; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to means for equally distributing the amount of work required of three horses when hitched three abreast; and it consists of features of construction in what are known as "draft-equalizers," as hereinafter described, and specifically set forth in the claim.

Figure 1:
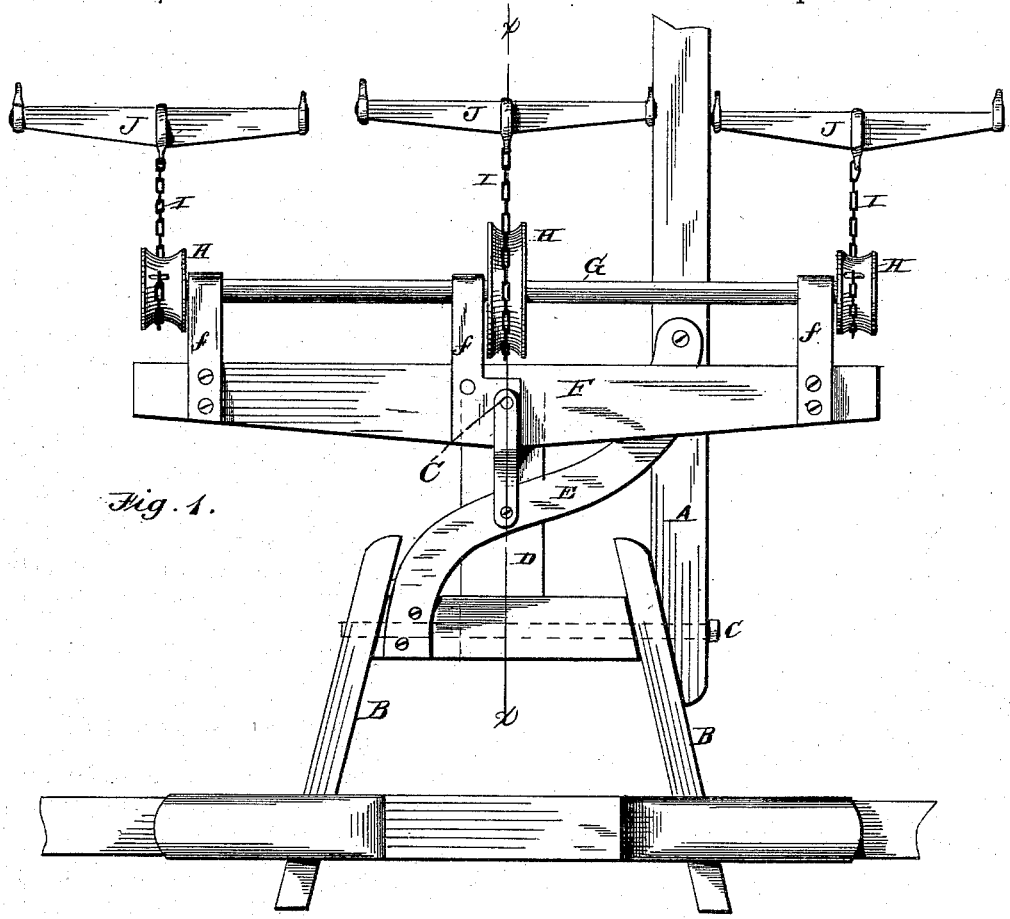
Figure 2:
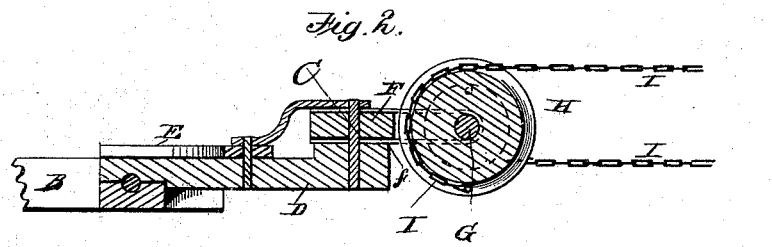

Figure 1 represents in plan, and Fig. 2 in section on the line $xx$ of Fig. 1, a draft-equalizer constructed in accordance with my invention.

Like letters refer to like parts in both figures.

A represents the pole, which at its end bears against the outside of one of the hounds, B, and is secured thereto by a bolt, C, passing through both hounds and a short pole, D, the bolt C passing through the cross-piece of the same, as shown in dotted lines. Both poles are strengthened by a curved iron brace, E, secured at one end of the cross-piece and at the tops of the short and long poles by screws or bolts, as clearly shown.

F is an evener, secured to the short pole in the usual manner, and it is provided with brackets $f$, having suitable bearings for a shaft, G, at the center and ends of which are rigidly secured pulleys H, those at the ends of the shaft being about one-half the diameter of that at the middle. To each of the pulleys is secured, by a chain, I, the whiffletrees J J J; or said whiffletrees may, if desired, be connected to the pulleys by any other flexible means, as a band or belt. The outer chains pass under their respective pulleys, while the middle chain passes over its pulley, and therefore it will readily be seen that the power exerted at both of the end pulleys is balanced by a power one-half in amount exerted at the middle pulley by reason of its being double the diameter of each of the end pulleys, and the evener being pivoted in the center of the load or line of draft, the greatest economy of power is attained. The parts, being detachably connected, may be removed by withdrawing the bolt C, when an ordinary two-horse pole may be employed when desired.

Having described my invention and its operation, what I claim as new, and desire to secure by Letters Patent, is—

1. The combination of an evener, a shaft bearing pulleys, flexible connections, and whiffletrees, substantially as shown and described.

2. The combination of a short pole, a parallel long pole, a curved brace, an evener, a shaft bearing pulleys, flexible connections, and whiffletrees, substantially as shown and described.

3. The combination of the evener F, provided with the brackets $f$, the shaft G, having pulleys H H H, the central pulley being of greater diameter than the others, the chains I I I, passing about the pulleys, as described, and the whiffletrees J J J, substantially as shown and described.

4. The combination of the short pole D, the long pole A, the hounds B B, the bolt C, and the curved brace E, substantially as shown and described.

In testimony whereof I affix my signature in presence of two witnesses.

MARK FRISBIE.

Witnesses:
JAMES F. WALLACE,
FRED SCHNEIDER.